United States Patent [19]
Routledge

[11] Patent Number: 5,934,731
[45] Date of Patent: Aug. 10, 1999

[54] DISCHARGE CONTROL FOR THE TAIL GATE OF A TRUCK

[75] Inventor: Elgin Routledge, Box 2339, Virden, Manitoba, Canada, R0M 2C0

[73] Assignee: Elgin Routledge, Virden, Canada

[21] Appl. No.: 08/931,484

[22] Filed: Sep. 16, 1997

[51] Int. Cl.[6] .................................................. B62D 25/24
[52] U.S. Cl. ........................ 296/51; 296/50; 298/23 S; 74/105; 160/116; 160/180
[58] Field of Search .................... 296/50, 51, 61; 192/69; 403/362, 359, 383; 298/23 D, 23 S; 74/105; 160/116, 180, 370.1

[56] References Cited

U.S. PATENT DOCUMENTS

| | | | |
|---|---|---|---|
| 886,090 | 4/1908 | Stryker | 160/116 |
| 1,394,198 | 10/1921 | Lawrence | 160/180 |
| 2,951,726 | 9/1960 | Ackerman | 296/51 |
| 4,838,598 | 6/1989 | Hyde | 296/50 |
| 4,852,933 | 8/1989 | Spector | 296/50 |

*Primary Examiner*—D. Glenn Dayoan
*Assistant Examiner*—Paul Chenevert
*Attorney, Agent, or Firm*—Adrian D. Battison; Murray E. Thrift

[57] ABSTRACT

A discharge control apparatus for the rear slide gate on the tail gate of a truck box comprises a rod mounted horizontally across the tailgate from a free beyond one side of the tail gate. The rod is formed in two portions which can divided as a coupler between a center section of the tail gate and a side section of the tailgate. The rod portion of the center section is connected by a pair of cranks to the slide gate. A lever on the free end of the rod can be rotated manually and the rod locked at a required position to hold the slide gate at the required opening. The coupling can be disconnected by pulling the side rod portion away from the center rod portion to allow the center section to be opened.

6 Claims, 2 Drawing Sheets

DISCHARGE CONTROL FOR THE TAIL GATE OF A TRUCK

FIELD OF THE INVENTION

The invention relates to an apparatus for controlling the discharge gate at the tail gate of a truck.

BACKGROUND

The tail gate of a truck conventionally comprises a tail gate panel formed in three sections including a center section and two side sections. The center section is hinged so that it can pivot relative to the two side sections to open the center section for access to the truck box. The center section further includes a central discharge opening with a vertically slideable gate member controlling the opening. In most cases particulate material such as grain can be discharged from the truck box by opening the slide gate member and pouring the particulate material through the relatively narrow opening of the center section for discharge into a hopper or other like.

When it is required for the material to be discharged, the operator must reach across to the gate member to lift the gate member. As the gate member at this time is generally located over a hopper or similar device for collecting the material, the operator must reach across without being able to stand immediately adjacent the gate member so that there is the potential for slipping and falling. In addition there is little control of the gate member in its sliding action.

Complex expensive remote control devices have been provided for actuating movement of the gate member. Thus a device manufactured by Cancade of Brandon, Manitoba provides a remote control operating a cylinder driving the gate member and operating the lift mechanism of the truck box. However devices of a similar nature are also available. However these devices are relatively expensive and complex so that there acceptance is limited.

SUMMARY

It is one object of the present invention to provide and improved discharge control apparatus which is simple, inexpensive and manually operable.

According to the present invention there is provided a discharge control apparatus for the tail gate of a truck comprising;

a tail gate panel having a center section and two side sections, the center section being mounted for pivotal movement out of the plane of the panel for opening the center section;

an opening in the center section having a gate member mounted on the center section for vertical sliding movement such that the gate member can be moved from a closed position closing the opening to an open raised position for discharge of material through the opening;

and an actuating linkage for effecting sliding movement of a gate member comprising;

a rod member extending across the tail gate from a free end at one side of the tail gate;

the rod member having a first portion extending from said free end across the adjacent sides section and a second portion extending across the center section;

means mounting the first portion on the side section for rotation about a longitudinal axis of the rod member;

means mounting the second portion on the center section for rotation about a longitudinal axis of the rod member;

a coupler for releasably connecting the first and second portions, the coupler being arranged to communicate rotation of the first portion about the axis of the rod member to the second portion and the coupler being releasable to disconnect the first portion from the second portion by pulling the first portion longitudinally away from the second portion;

a manually operable lever at said free end projecting outwardly beyond said one side for rotating the first portions;

and a crank extending from the second portion to the gate member for effecting sliding room to the gate member, the crank comprising a first lever mounted on the second portion and a second lever pivotally connected to the first lever and extending from the first lever to the gate member.

Preferably, the manual operable lever is arranged such that it extends substantially vertically downwardly in the closed position of the gate member and extends upwardly and rearwardly in the open position of the gate member.

Preferably, there is provided on the side a catch member for engaging and locating the manually operable lever in the closed position.

Preferably, there is a lock for locating the gate member in an open position.

Preferably, the lock comprises a clamp member for engaging the rod member and a selected angular orientation of the rod member to hold the gate member at the position determined by the selected angular orientation of the rod member.

Preferably, the lock comprises a sleeve with a screw clamp located on the side section at a position adjacent the manually operable handle.

BRIEF DESCRIPTION OF THE DRAWINGS

In the accompanying drawings, which illustrate an exemplary embodiment of the present invention.

DETAILED DESCRIPTION

Figure 1:
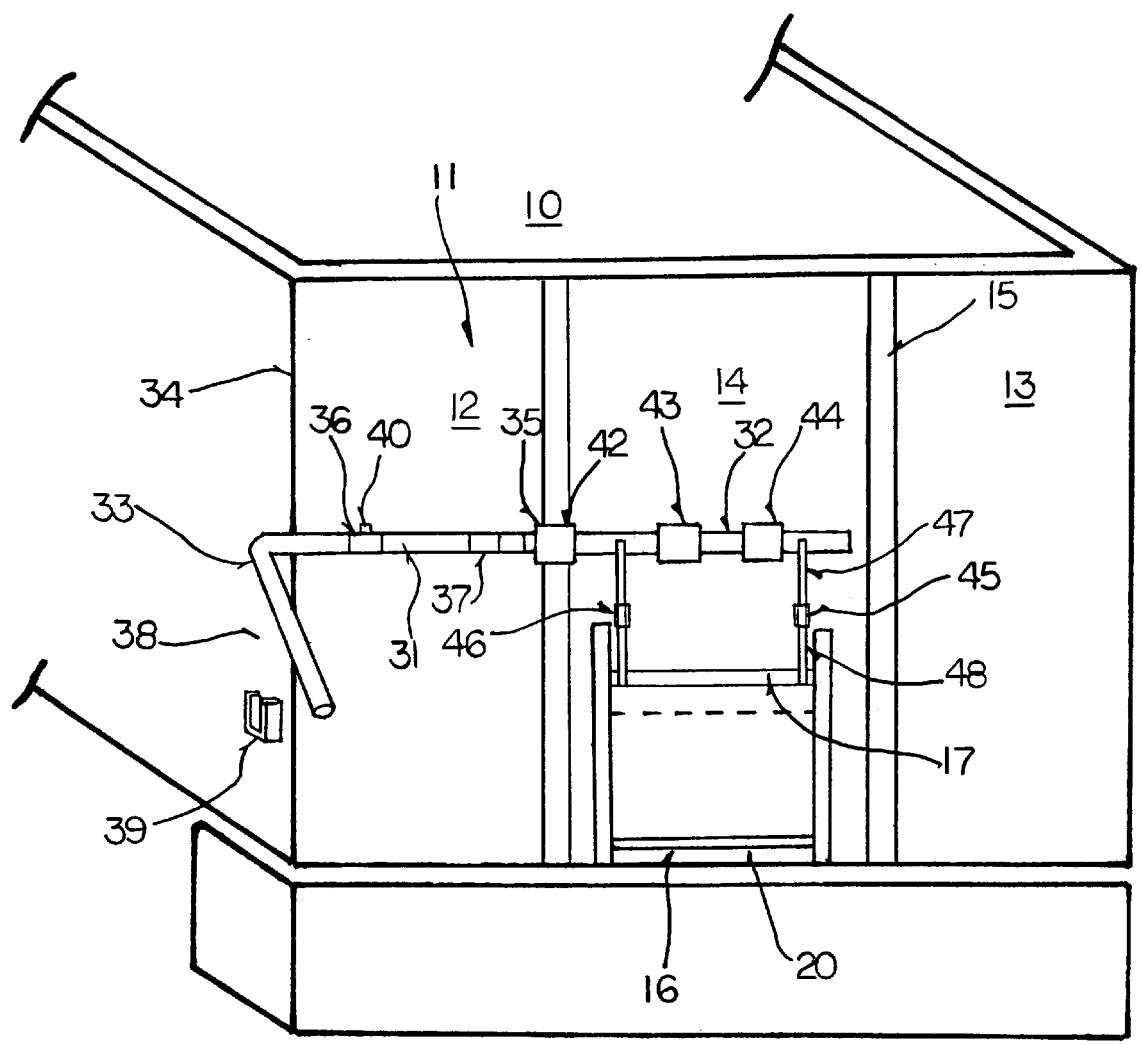
FIG. 1 is a isometric view from the rear and one side of the tail gate of a truck box showing the discharge apparatus of the present invention in a partially opened position of the gate member.

A truck box 10 includes a tail gate 11 defining a tail gate panel standing in a vertical plane at the end of the truck box. The tailgate is formed in three sections including two side sections 12 and 13 and a center section 14. The center section 14 is coupled to the side section 13 by a hinge 15 allowing the center section to pivot about the vertical axis defined by the hinge 15 out of the plane of the panel and away from the side section 12 to allow access to the interior of the box 10.

The center section 14 includes an opening 16 controlled by a slide gate 17 maneuverable vertically in a pair of spaced slide guides 18 and 19 on respective sides of the opening 16. The gate 17 is in a form of a rectangular panel with a bottom edge 20 which in the closed position is at the bottom edge of the center section 14 closing the opening 16. The gate 17 can be moved vertically upwardly to a raised position of the bottom edge 20 allowing material within the truck box to be discharged through the opening 16.

The discharge control apparatus of the present invention comprises a rod member generally indicated at 30 including a first rod portion 31 and a second rod portion 32. The first rod portion 31 extends from the free end 33 beyond the side edge 34 of the side section 12 to a coupling portion 35 joining the first portion 31 and the second portion 32. The first portion is mounted on the side section 12 by a pair of sleeves 36 and 37 attached to the outside surface of the side section 12 allowing rotation of the rod portion 31 about its axis. A manual operable lever 38 is provided on the free end 33 and in a closed position of the gate member extends vertically downwardly along the side edge 34 to a retaining catch 39 which holds the handle in place. A screw clamp 40 includes a screw threaded member engaged into a threaded receptacle in the sleeve 36 and can be rotated to clamp the outside surface of the rod portion 31 to hold the rod portion at a required angular orientation.

The coupling 35 comprises a polygonal shaft portion 41 on the end of the rod portion 31 and engageable into a sleeve 42 having an internal bore shaped to match the cross section of the shaft portion 41. Thus the coupling allows rotation from the rod portion 31 to be communicated to the rod portion 32 while allowing the rod portion 31 to be pulled out of the sleeve 42 by sliding movement through the sleeves 36 and 37. This release of the coupling 35 allows the center section to be opened about the hinge line 15.

The rod portion 32 is mounted on a similar pair of sleeves 43 and 44 attached to the outside surface of the center section 14 to be carried thereby. The rod portion 32 carries a pair of cranks 45 and 46 which are actuated by rotation of the rod member 30 to raise and lower the gate member 17 and when the gate member 17 is in the closed position the cranks 45 and 46 lay flat against the center section 14. Each crank comprises a first lever 47 and a second lever 48. The first lever 47 is attached to the rod portion 32 for rotation with about the longitudinal axis of the rod. The second lever 48 is pivotally connected to the outer end of the first lever 47 and pivotally connected to a flange on the gate member 17.

Figure 2:
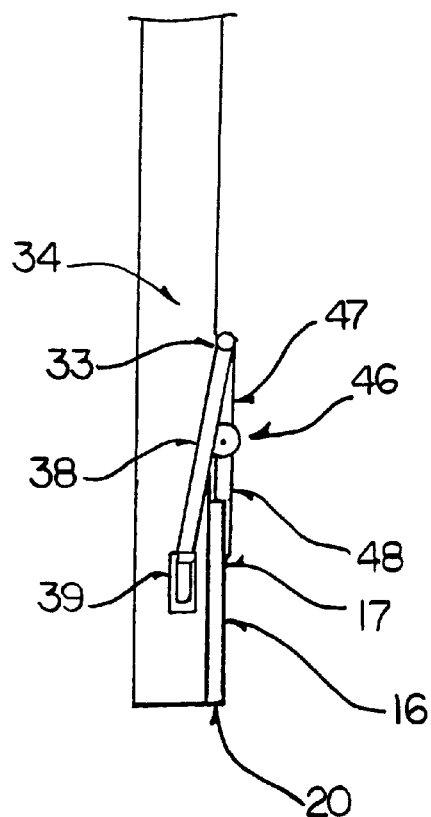
FIG. 2 is a side elevational view of the apparatus of FIG. 1 in a fully closed position.
Figure 3:
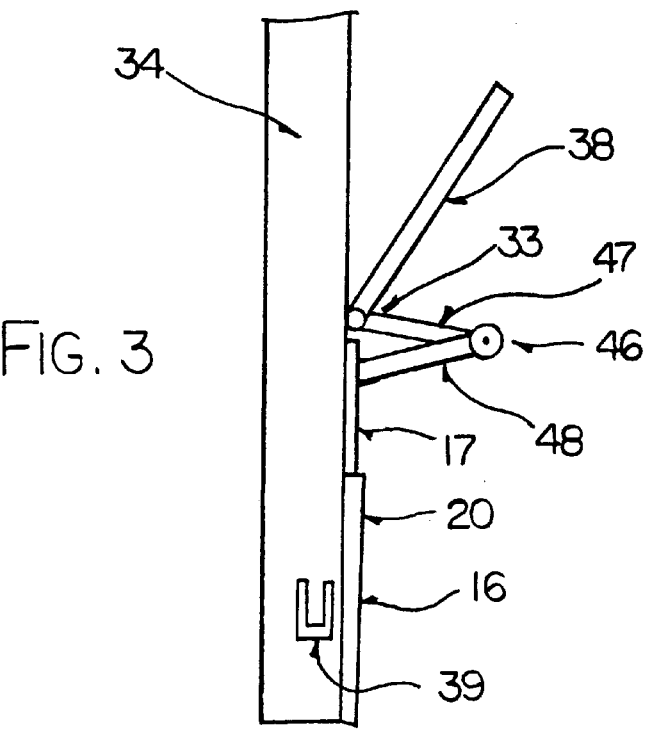
FIG. 3 is a side elevational view similar to that of FIG. 2 showing the gate in the raised position.

As best shown in FIG. 2, in the closed position of the gate member, the lever 38 extends vertically downwardly into the latch 39.

When released from the latch 39, the lever 38 can be rotated in counter clockwise direction rotating the cranks 45 and 46 to lift the gate 17 to required degree of opening. The screw lock 40 can then be operated to locate the rod at the required orientation to maintain the gate 17 at the required open position.

It will be fully clear to an operator of the vehicle when the gate member 17 is closed simply by looking through the mirror of the vehicle to see the position of the lever 38.

While one embodiment of the present invention has been described in the foregoing, it is to be understood that other embodiments are possible within the scope of the invention. The invention is to be considered limited solely by the scope of the appended claims.

I claim:

1. A tail gate discharge control apparatus for the tail gate of a truck comprising;

a tail gate panel having a center section and two side sections, the center section being mounted for pivotal movement out of the plane of the panel for opening the center section;

an opening in the center section having a gate member mounted on the center section for vertical sliding movement such that the gate member can be moved from a closed position closing the opening to an open raised position for discharge of material through the opening;

and an actuating linkage for effecting sliding movement of the gate member comprising:

a rod member extending across the tail gate from a free end at one side of the tail gate;

the rod member having a first portion extending from said free end across the adjacent side sections and a second portion extending across the center section;

means mounting the first portion on the side section for rotation about a longitudinal axis of the rod member;

means mounting the second portion on the center section for rotation about a longitudinal axis of the rod member;

a coupler for releasably connecting the first and second portions, the coupler being arranged to communicate rotation of the first portion about the axis of the rod member to the second portion and the coupler being releasable to disconnect the first portion from the second portion by pulling the first portion longitudinally away from the second portion;

a manually operable lever at said free end projecting outwardly beyond said one side for rotating the first portion;

and a crank extending from the second portion to the gate member for effecting sliding movement to the gate member, the crank comprising a first lever mounted on the second portion and a second lever pivotally connected to the first lever and extending from the first lever to the gate member.

2. The apparatus according to claim 1 wherein the manual operable lever is arranged such that it extends substantially vertically downwardly in the closed position of the gate member and extends upwardly and rearwardly in the open position of the gate member.

3. The apparatus according to claim 1 wherein there is provided on said one side a catch member for engaging and locating the manually operable lever in the closed position.

4. The apparatus according to claim 1 including a lock for locating the gate member in the open position.

5. The apparatus according to claim 4 wherein the lock comprises a clamp member for engaging the rod member and a selected angular orientation of the rod member to hold the gate member at the position determined by the selected angular orientation of the rod member.

6. The apparatus according to claim 5 wherein the lock comprises a sleeve with a screw clamp located on the side section at a position adjacent the manually operable handle.

* * * * *